(12) United States Patent
Mano et al.

(10) Patent No.: US 6,571,367 B1
(45) Date of Patent: May 27, 2003

(54) METHOD AND APPARATUS CONNECTING BETWEEN A FIBER CHANNEL AND A CACHE MEMORY

(75) Inventors: Oren Mano, Framingham, MA (US); Paul C. Wilson, Mendon, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/525,648

(22) Filed: Mar. 15, 2000

(51) Int. Cl.[7] ................................................. G06F 11/10
(52) U.S. Cl. ...................................................... 714/763
(58) Field of Search ................................ 714/758, 763

(56) References Cited

U.S. PATENT DOCUMENTS

| | | | | |
|---|---|---|---|---|
| 5,719,885 A | * | 2/1998 | Ofer et al. ........................ 714/6 |
| 5,727,218 A | * | 3/1998 | Hotchkin ...................... 710/260 |
| 5,872,822 A | * | 2/1999 | Bennett ........................ 370/412 |
| 5,890,207 A | * | 3/1999 | Sne et al. ...................... 711/113 |
| 6,003,144 A | * | 12/1999 | Olarig et al. ................... 714/42 |
| 6,012,119 A | * | 1/2000 | Ninomiya et al. ........... 710/305 |
| 6,057,863 A | * | 5/2000 | Olarig .......................... 345/501 |
| 6,065,087 A | * | 5/2000 | Keaveny et al. ............. 370/402 |
| 6,202,105 B1 | * | 3/2001 | Gates et al. ..................... 710/1 |
| 6,249,878 B1 | * | 6/2001 | MacLellan et al. ............. 714/6 |
| 6,279,050 B1 | * | 8/2001 | Chilton et al. ............... 710/104 |
| 6,314,477 B1 | * | 11/2001 | Cowger et al. .............. 370/394 |
| 6,317,805 B1 | * | 11/2001 | Chilton et al. ............... 710/104 |
| 6,324,669 B1 | * | 11/2001 | Westby ......................... 714/805 |
| 6,418,488 B1 | * | 7/2002 | Chilton et al. ............... 710/104 |

* cited by examiner

Primary Examiner—Stephen M. Baker
(74) Attorney, Agent, or Firm—Daly, Crowley & Mofford, LLP

(57) ABSTRACT

A method and apparatus for connecting between a serial fibre channel link and a global memory provide a bidirectional high throughput path for enabling reliable communications and translation from the fibre channel format to the format required by the global memory. The apparatus includes, in series from the fibre channel link, a bidirectional physical interface, a bidirectional conversion circuitry for converting between an electrical protocol from the fibre channel and a high speed conventional protocol such as a PCI bus, a bidirectional lower machine controlled by a central processing unit and able to add block protection words to the passing data stream, and for separating the data stream into one of a plurality of pipes as directed by the CPU, an error detection and correction circuitry for adding yet additional error correcting data to the data stream as it written in the global memory and for detecting and correcting, if possible, any errors in data being retrieved from global memory. The apparatus further includes dual port random access memories for buffering between the error detection and correction circuitry and the global memory. A secondary port interface is provided, connected to the CPU bus, for providing information to configure at least conversion circuitry.

7 Claims, 4 Drawing Sheets

METHOD AND APPARATUS CONNECTING BETWEEN A FIBER CHANNEL AND A CACHE MEMORY

BACKGROUND OF THE INVENTION

The invention relates generally to disk drive systems, and more particularly, to a processing mechanism for transferring data between a fibre channel and the cache memory of a disk drive controller.

Disk drive systems have grown enormously in both size and sophistication in recent years. These systems typically include many large disk drive units controlled by a complex multi-tasking disk drive controller such as the EMC Symmetrix disk drive controller. A large scale disk drive system can typically receive commands from a number of host computers and can control a large number of disk drive mass storage elements, each mass storage element being capable of storing in excess of several gigabits of data. There is every reason to believe that both the sophistication and size of the disk drive systems, and the controllers contained within them, will continue to increase.

As the systems grow, and become faster, the demands for moving data within the disk drive controller increase. Not only are these demands upon the disk drive controller to increase data throughput, but in addition, there are requirements for improving the quality of the data passed through the system, that is, to provide for necessary error checking, and reliability as the flow of data increases substantially.

In accordance with the invention, therefore, there is advantageously provided an increased flow rate system for moving data between the large cache memory of a Symmetrix disk drive system controller and the fibre of a high data rate fibre channel which can feed data, to, or take data from, the controller. The invention also provides for a reliable and flexibly controllable data path through which the data passes.

SUMMARY OF THE INVENTION

The invention relates to a method and apparatus for connecting between a serial fibre channel link and a global memory. The apparatus features a bidirectional physical interface for terminating the fibre channel link at a first port and an electrical interface signal at a second port; a bidirectional conversion circuitry connected to the second port for connecting between the electrical interface signal and a high bandwidth data signal, for example, a PCI data signal; a bidirectional lower machine connected to a CPU bus for connecting between the PCI data signal and a multi-pipe input/output signal; an error detection and correction circuitry for converting between the primary input/output signal and a corrected input/output signal; a plurality of dual port random-access-memories for storing the corrected input/output signal and forwarding such corrected input/output signal to a global memory; a secondary port interface connected to a CPU bus and to the conversion circuitry over a secondary port interface bus, for controlling the conversion circuitry; and a second random-access-memory connected to the secondary port interface bus.

BRIEF DESCRIPTION OF THE DRAWINGS

Other features and advantages of the invention will be apparent from the following description, taken together with the drawings in which.

DESCRIPTION OF PARTICULAR PREFERRED EMBODIMENTS

Figure 1:
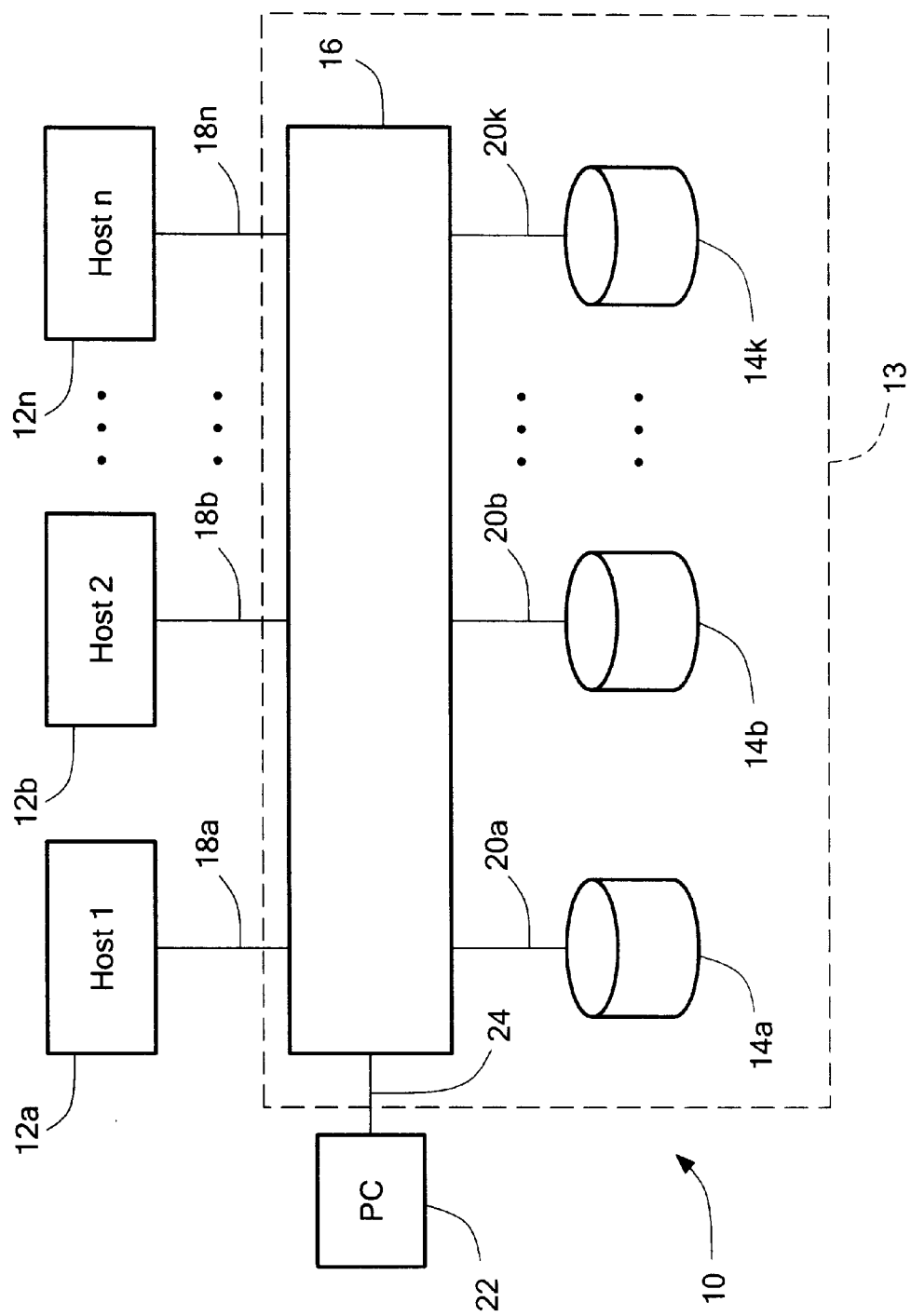
FIG. 1 is a schematic block diagram of a system in with which the invention is useful.

Referring to FIG. 1, the invention relates to a computer system 12 which has a plurality of host computers 12a, 12b, . . . , 12n and a mass storage system 13 having a plurality of disk drive elements 14a, 14b, . . . , 14k. Interconnecting the host computers 12 and the disk drive elements 14 is a disk drive controller 16, for example that manufactured and sold by EMC Corporation and known as the Symmetrix controller. The disk drive controller 16 receives memory commands from the various host computers over buses 18a, 18b, . . . , 18n respectively, for example connected and operating in accordance with a SCSI protocol, and delivers the data associated with those commands to or from the appropriate disk drive elements 14 over respective connected buses 20a, 20b, . . . , 20k. Buses 20 also preferably operate in accordance with a SCSI protocol.

Each of the disk drive elements typically has in excess of a one gigabit of memory and is logically divided, in accordance with known techniques, into a plurality of logical volumes. Each disk drive element 14 can thus have a plurality of logical volumes, for example, four, eight, or more logical volumes, on a single disk drive element. In a typical configuration, the controller system also connects to a console PC 22 through a connecting bus 24. The console PC 22 can be used for maintenance and access to the controller and can be employed to set parameters of or initiate maintenance commands to the controller, under user control, as is well known in the art.

Figure 2:
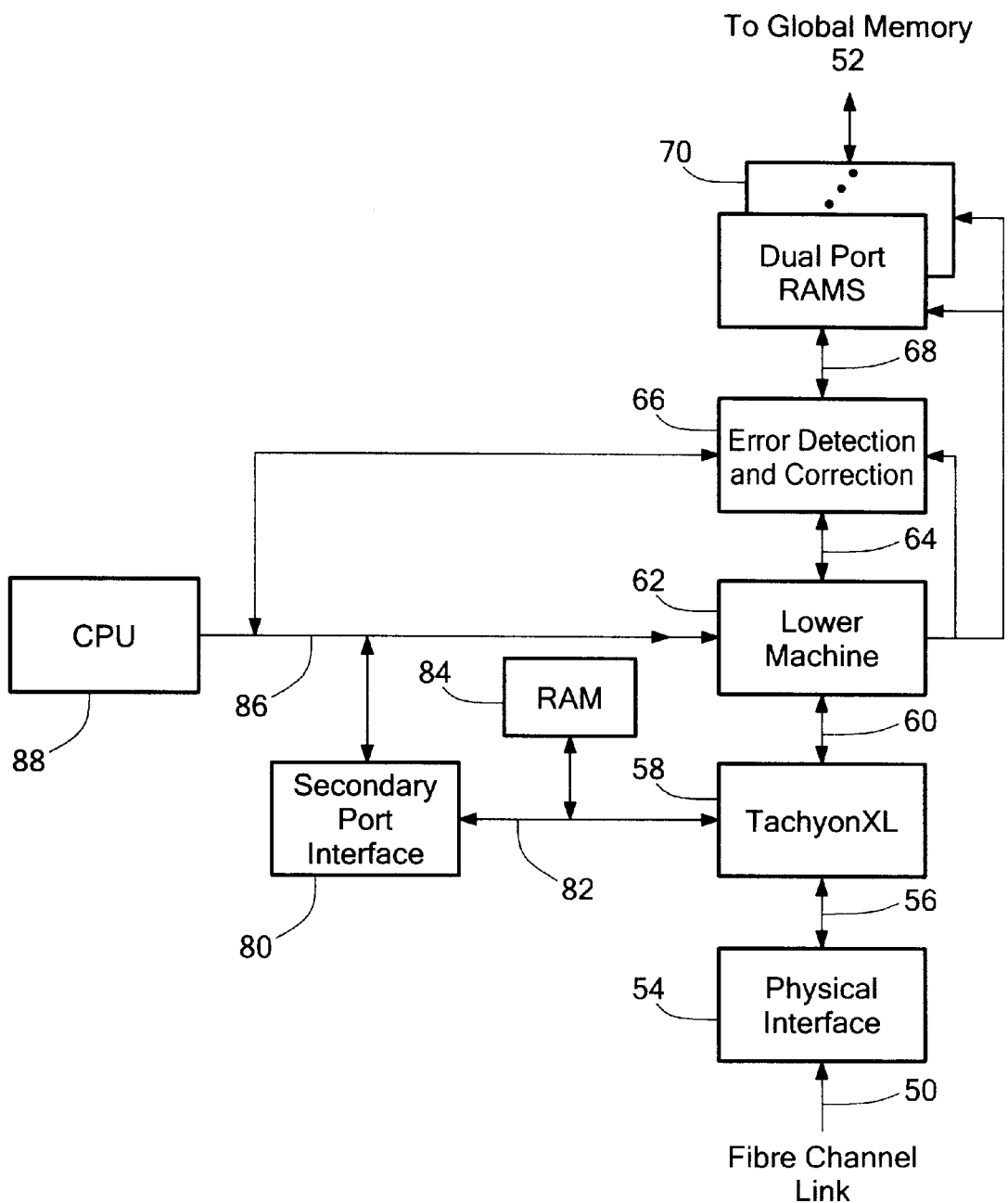
FIG. 2 is a schematic block diagram illustrating the through data path within the disk controller system in accordance with the invention.

As indicated above, in operation, it is desirable to provide high speed data throughput to and from the global memory contained in the disk drive controller. The global memory is a cache memory. Accordingly, referring to FIG. 2, there is provided a data path between a fibre channel link over a line 50 and a global memory 52 of the disk drive controller. The fibre channel link is connected to a physical interface 54 which provides electrical signals over, in the illustrated embodiment, a ten bit interface bus 56 to a TachyonXL ASIC manufactured by Hewlett-Packard. The TachyonXL acts as a translation conversion device between the fibre channel provided data over lines 56 and, in the illustrated embodiment of the invention, a wide band bus having a standard protocol, here a 64 bit wide PCI bus 60, operating at 40 megahertz. The PCI bus connects to a so-called lower machine 62, described below, which converts the input data to one of eight paths or "pipes" which are delivered over a 64 bit, 40 megahertz input/output bus 64 to an error detection and correction circuitry 66. The error detection and correction circuitry, which adds error protection bits to each data word, in the write direction, generates an output over a bus 68 to a plurality, eight in the illustrated embodiment, of dual port random-access-memories 70. The random-access-memories 70 connect to the global memory 52 over a bus 72 (and any additional circuitry required by the controller).

The path from the fibre channel link to the global memory 52 is bidirectional so that in passing from the fibre channel link to the global memory, the data passes in a write mode (writing to global memory) while passing from global memory to the fibre channel link the data is in a read mode (that is reading from the global memory 52 for output over the fibre channel link 50). The TachyonXL ASIC 58 is controlled through a secondary port interface 80 which connects to the TachyonXL ASIC over a 32 bit wide, 66 megahertz, secondary port interface bus 82. Associated with the secondary port interface is a RAM 84 which, in the illustrated embodiment of the invention, contains 256 K 36 bit words.

The secondary port interface, the lower machine, and the error detection and correction circuit all connect over a CPU bus 86. The CPU bus 86 connects to a CPU (central processing unit) 88 which controls the operation of the circuitry.

Figure 3:
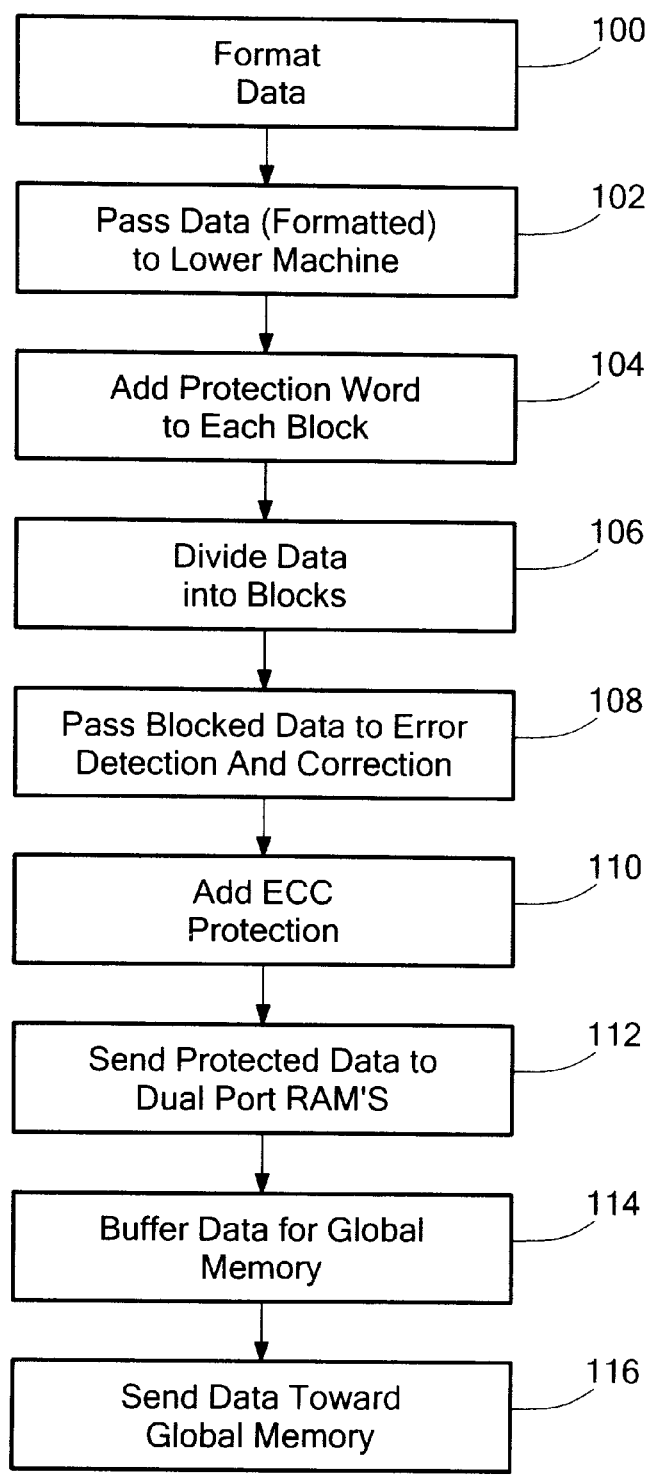
FIG. 3 is a flowchart illustrating write operation of the invention illustrated in FIG. 2.

In operation, referring to FIG. 3, data from the fibre channel link passes in the write direction, to the TachyonXL ASIC wherein it is separated and formatted at 100, here for the PCI bus 60. The TachyonXL ASIC is configured as controlled by the CPU 88 through the secondary port interface 80 so that the flow of data over bus 60 is not interrupted even though controlling information is passing between the secondary port interface 80 and the TachyonXL ASIC 58. In this manner, the TachyonXL ASIC can be configured under computer control while maintaining a high throughput through the system. That is, the control of the ASIC 58 is separated from the data flow.

The bus 60 output from the TachyonXL, passes at 102, to the lower machine 62. The lower machine typically adds, at 104, a protection word to each block of data in the write direction (and, accordingly, subtracts the same protection word from the blocks of data flowing in the reverse or read direction), and divides at 106, the input into one of eight, in the illustrated embodiment, available pipes which are directed to global memory. Each pipe is configured separately in accordance with the data addresses so that data in a pipe is properly directed and formatted to what will eventually be the correct location in memory by a "pipe" configured to properly process the data. Control for effecting the correct pipe parameters is available from the CPU. The CPU, in this instance, recognizes the nature of the each incoming dataflow, and through the secondary port interface and the lower machine 62 appropriately configures a pipe, or uses an existing pipe configuration, at the lower machine 62. The flow of data from the new or other pipes, however, is typically not interrupted at this time. If necessary, however, the flow of data through the lower machine is interrupted, briefly, as a pipe is being set up. Once the pipe is set, the lower machine passes the data through it, adding necessary parameters, such as the block protection word, to the data, blocks the data at 106, and passes the data on to the error detection and correction circuitry, at 108. The error detection and correction circuitry 66 controlled by the lower machine and the CPU, in accordance with the requirements of the cache memory, passes, at 112, the data on to the corresponding dual port RAM where it is stored, at 114, and forwarded, at 116, thereafter to global memory. (The lower machine, in the illustrated embodiment, can implement eight different classes of "pipes" as controlled by the CPU 88).

Figure 4:
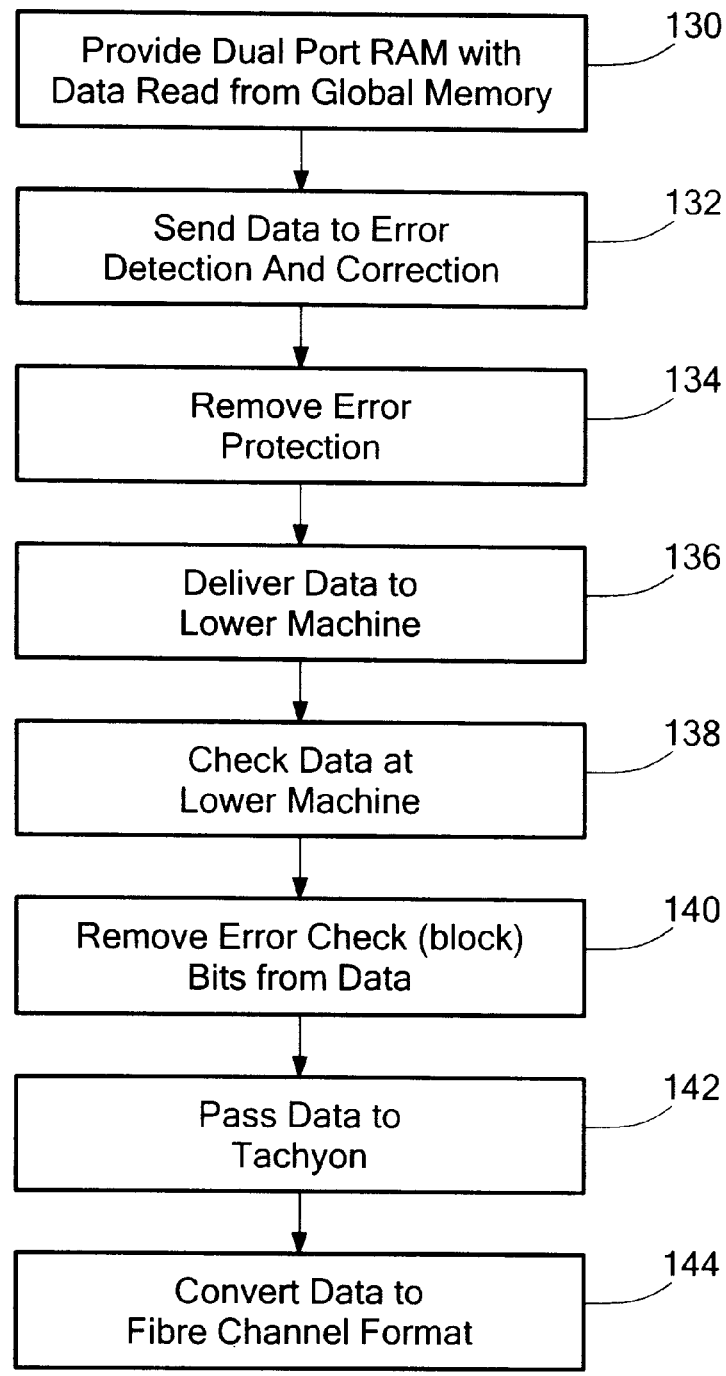
FIG. 4 is a flowchart illustrating read operation of the system of FIG. 2, in accordance with the invention.

In the reverse (read) direction, referring to FIG. 4, the data is provided at 130, from the global memory to one of the dual port random-access-memories 70. The output of the dual port random-access-memory is provided at 132, to the error detection and correction circuitry which checks the error protection which had been added to the data during a previous write (for example, using a different machine), and removes, at 134, those error correction bits as the data passes, at 136, to the lower machine circuitry 62. At the lower machine, a further error check is performed at 138, (recall that the lower machine added an error block protection word during the write process) and if no errors have occurred, the additional protection word originally added by the lower machine is removed at 140 and the data is passed on at 142 to the TachyonXL for conversion at 144 into a format which can be placed on the fibre channel link. This all occurs, also, under the control of the CPU 88 through the CPU bus.

It is important to recognize that the CPU herein does not interfere with the data transfer along the bidirectional path between the fibre channel link and the global cache memory, and further enables the pipes (data paths) to be set up in the lower machine to handle different kinds of data as they pass through the system. In particular, the data can be handled according to its address, and up to eight different pipes can be implemented in the lower machine, in this illustrated embodiment, to accommodate different classes of data. The class of data is indicated by the data destination, in the illustrated embodiment of the invention, and further, can be varied in accordance with other parameters.

Additions, subtractions, and other modifications of the described embodiment will be apparent to those practiced in this field and are within the scope of the appended claims.

What is claimed is:

1. Apparatus for connecting between a serial fibre channel link and a global memory comprising:

a bidirectional physical interface for terminating the fibre channel link at a first port and an electrical interface signal a second port, a bidirectional conversion circuitry connected to the second port for connecting between the electrical interface signal and a PCI data signal, a bidirectional lower machine connected to a CPU bus for connecting between the PCI data signal and a multi-pipe input/output signal, an error detection and correction circuitry for converting between said multi-pipe input/output signal and a corrected input/output signal, a plurality of dual port random-access-memories for storing the corrected input/output signal and forwarding said the corrected input/output signal to a global memory, a secondary port interface connected to the CPU bus, and to the conversion circuitry, over a secondary port interface bus, for controlling the conversion circuitry, and a second random-access-memory connected to said secondary port interface bus.

2. The apparatus of claim 1 wherein said bi-directional lower machine receives the PCI data signal directed to one of a plurality of pipes configured according to data from the CPU bus, and adds to each block of data, a protection word.

3. The apparatus of claim 1 wherein the error detection and correction circuitry receives the multi-pipe input/output signal, and adds to it error checking data, and which, when it receives data from the dual port random access memories, checks for accuracy and corrects if necessary and possible.

4. The apparatus of claim 1 further comprising a bi-directional path implemented by said elements of said apparatus providing a continuous flow path between the serial fibre channel link and global memory, and said elements of said apparatus receive command instructions separately, over non-data channels, form a central processing unit over the CPU bus.

5. A method of transferring data between a serial fibre channel link and a global memory comprising the steps of
converting the fibre channel link data to a PCI data format;
converting the PCI formatted data to data for one of a plurality of data pipes,
configuring a data pipe for each incoming group of data without interrupting the flow of data from the fibre channel link,
providing block protection bits to said pipelined data in a write direction to global memory and error detection/correction capability to the data flowing to global memory; and
buffering said data through a plurality of dual port random access memories between the correction and detection steps and global memory.

6. The method of claim 5 further comprising
applying control signals to control the flow of data from the fibre channel link to the global memory without interrupting the flow of data from the fibre channel link to global memory.

7. The method of claim 5 further comprising
providing a secondary bus control for enabling high speed CPU control of at least one element in the path between the serial fibre channel link and the global memory.

* * * * *